(12) United States Patent
Fulayter et al.

(10) Patent No.: US 10,697,320 B2
(45) Date of Patent: Jun. 30, 2020

(54) PIEZOELECTRIC VIBRATORY CONTROL FOR STATIC ENGINE COMPONENTS

(71) Applicant: Rolls-Royce Corporation, Indianapolis, IN (US)

(72) Inventors: Roy D. Fulayter, Avon, IN (US); Michael G. Meyer, Greenwood, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 191 days.

(21) Appl. No.: 15/867,309

(22) Filed: Jan. 10, 2018

(65) Prior Publication Data

US 2018/0209345 A1   Jul. 26, 2018

Related U.S. Application Data

(60) Provisional application No. 62/448,582, filed on Jan. 20, 2017.

(51) Int. Cl.
| | |
|---|---|
| *F01D 25/04* | (2006.01) |
| *F02C 7/045* | (2006.01) |
| *G10K 11/178* | (2006.01) |
| *F01D 5/22* | (2006.01) |
| *F01D 25/28* | (2006.01) |
| *F02C 7/24* | (2006.01) |

(52) U.S. Cl.
CPC ............... *F01D 25/04* (2013.01); *F01D 5/22* (2013.01); *F01D 25/28* (2013.01); *F02C 7/045* (2013.01); *F02C 7/24* (2013.01); *G10K 11/17857* (2018.01); *G10K 11/17873* (2018.01); *F05D 2260/407* (2013.01); *F05D 2260/96* (2013.01); *F05D 2260/962* (2013.01); *G10K 2210/1281* (2013.01)

(58) Field of Classification Search
None
See application file for complete search history.

(56) References Cited

U.S. PATENT DOCUMENTS

| | | | |
|---|---|---|---|
| 4,967,550 | A | 11/1990 | Acton et al. |
| 5,005,353 | A | 4/1991 | Acton et al. |
| 5,082,421 | A | 1/1992 | Acton et al. |
| 5,141,391 | A | 8/1992 | Acton et al. |
| 6,299,410 | B1 | 10/2001 | Hilbert et al. |
| 6,688,439 | B2 | 2/2004 | Bhattacharya et al. |

(Continued)

FOREIGN PATENT DOCUMENTS

| | | |
|---|---|---|
| DE | 10355624 A1 | 7/2005 |
| DE | 102013008103 A1 | 11/2014 |

(Continued)

OTHER PUBLICATIONS

Extended EP Search Report completed Jun. 26, 2018 and issued in connection with EP Appln. No. 18151989.3.

*Primary Examiner* — Christopher Verdier
*Assistant Examiner* — Juan G Flores
(74) *Attorney, Agent, or Firm* — Barnes & Thornburg LLP

(57) ABSTRACT

A gas turbine engine assembly includes a static component and a rotatable component configured to rotate about a central axis of the gas turbine engine assembly relative to the static component. The gas turbine engine assembly further includes a vibration-dampening system configured to dampen vibration of the gas turbine engine assembly.

12 Claims, 2 Drawing Sheets

(56) References Cited

U.S. PATENT DOCUMENTS

| | | | |
|---|---|---|---|
| 6,851,530 B2 | 2/2005 | Wei | |
| 7,033,135 B2 | 4/2006 | Mortzheim et al. | |
| 7,384,240 B2 | 6/2008 | McMillan et al. | |
| 7,607,287 B2 | 10/2009 | Reba et al. | |
| 7,918,644 B2 | 4/2011 | Schreiber | |
| 7,992,674 B2 | 8/2011 | Gorny et al. | |
| 8,246,303 B2 | 8/2012 | Thomas et al. | |
| 8,569,928 B2 * | 10/2013 | Szwedowicz | F01D 5/16 310/321 |
| 2006/0151272 A1 | 7/2006 | Smith et al. | |
| 2008/0202664 A1 * | 8/2008 | Pletner | H01L 41/053 156/60 |
| 2012/0126665 A1 | 5/2012 | Szwedowicz et al. | |
| 2012/0133448 A1 | 5/2012 | Gregg et al. | |
| 2013/0192232 A1 * | 8/2013 | Clemen | F23R 3/28 60/734 |
| 2016/0194961 A1 | 7/2016 | Fulayter et al. | |
| 2017/0211592 A1 | 7/2017 | Klauke | |

FOREIGN PATENT DOCUMENTS

| | | |
|---|---|---|
| EP | 1074762 A2 | 2/2001 |
| EP | 3002414 A2 | 4/2016 |
| EP | 3093440 A1 | 11/2016 |
| GB | 2365945 A | 2/2002 |
| JP | 2009197649 A | 9/2009 |

* cited by examiner

PIEZOELECTRIC VIBRATORY CONTROL FOR STATIC ENGINE COMPONENTS

CROSS REFERENCE TO RELATED APPLICATIONS

This application claims priority to and the benefit of U.S. Provisional Patent Application No. 62/448,582, filed 20 Jan. 2017, the disclosure of which is now expressly incorporated herein by reference.

FIELD OF THE DISCLOSURE

The present disclosure relates generally to gas turbine engines, and more specifically to managing vibrations in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Gas turbine engine components may vibrate during use of the gas turbine engine due to, for example, harmonic vibration from the blades. Such vibration may cause engine wear and reduce engine life.

SUMMARY

The present disclosure may comprise one or more of the following features and combinations thereof.

A gas turbine engine assembly includes a wheel assembly, a compressor case, and a vibration-dampening system. The wheel assembly may include a plurality of blades arranged around a central axis of the gas turbine engine assembly. The wheel assembly may be configured to rotate about the central axis during use of the gas turbine engine assembly. The compressor case may be arranged circumferentially around the plurality of blades included in the wheel assembly. The vibration-dampening system may be coupled to the compressor case to dampen vibration of the compressor case during use of the gas turbine engine assembly. The vibration-dampening system may include a first piezoelectric element coupled to the compressor case, a second piezoelectric element coupled to the compressor case, and a circuit coupled to the first piezoelectric element and the second piezoelectric element.

In some embodiments, the first piezoelectric element may be configured to generate an electric signal in response to being energized by the vibration of the compressor case during use of the gas turbine engine assembly. The circuit may be configured to receive the electric signal, change a phase of the electric signal, and transmit the electric signal to the second piezoelectric element to energize the second piezoelectric element to cause the vibration of the compressor case to be dampened during use of the gas turbine engine assembly.

In some embodiments, the second piezoelectric element may be vibrated by the gas turbine engine assembly at a predetermined frequency during operation of the gas turbine engine assembly. The circuit may be configured to change the phase of the electric signal received from the first piezoelectric element so that the phase of the electric signal transmitted to the second piezoelectric element causes the second piezoelectric element to move in a destructive pattern relative to the predetermined frequency.

In some embodiments, the circuit may be configured to change the phase of the electric signal received from the first piezoelectric element to be about 180 degrees apart from a phase of the predetermined frequency. In some embodiments, the circuit is configured to determine the predetermined frequency.

In some embodiments, the compressor case may include an outer housing that extends at least partway about the central axis and a plurality of vanes that extend radially between the outer housing and the central axis. The first piezoelectric element may be aligned axially with the plurality of vanes.

In some embodiments, the second piezoelectric element may be spaced apart circumferentially from the first piezoelectric element. In some embodiments, the second piezoelectric element may be aligned axially with the first piezoelectric element. In some embodiments, the second piezoelectric element may be spaced apart axially from the first piezoelectric element.

In some embodiments, the vibration-dampening system further includes an electric system. The circuit may be coupled to the electric system. The electric system may be powered by at least a portion of an electric signal generated by the first piezoelectric element. In some embodiments, the electric system includes a resistive heater.

According to another aspect of the present disclosure, a gas turbine engine assembly includes a first component, a second component, and a vibration-dampening system. The first component may be configured to rotate about a central axis of the gas turbine engine assembly. The second component may be located adjacent the first component and configured to remain fixed relative to the central axis. The vibration-dampening system may include a first piezoelectric element coupled to the second component and energized by vibration of the second component during use of the gas turbine engine assembly.

In some embodiments, the vibration-dampening system may include an electric heater connected to the first piezoelectric element and powered by the first piezoelectric element in response to the first piezoelectric element being energized. In some embodiments, the gas turbine engine assembly includes a second piezoelectric element coupled to the second component and electrically connected to the first piezoelectric element such that the first piezoelectric element being energized causes movement of the second piezoelectric element.

In some embodiments, the vibration-dampening system may further include a circuit connected to the first piezoelectric element and the second piezoelectric element. The first piezoelectric element may generate an electric signal. The circuit may be configured to receive the electric signal, change a phase of the electric signal, and transmit the electric signal to the second piezoelectric element to energize the second piezoelectric element.

In some embodiments, the vibration-dampening system may include a circuit connected to the first piezoelectric element and the second piezoelectric element. The first piezoelectric element may generate a first electric signal. The second piezoelectric element may generate a second electric signal. The circuit may be configured to receive the first electric signal and the second electric signal, change a phase of the first electric signal and the second electric signal, transmit the first electric signal to the second piezoelectric element, and transmit the second electric signal to the first piezoelectric element after changing the phase of the first electric signal and the second electric signal.

In some embodiments, the vibration-dampening system further includes a second piezoelectric element coupled to the second component and a circuit connected to the first piezoelectric element and the second piezoelectric element. The second component may include a first vane and a second vane. The first piezoelectric element may be aligned axially and circumferentially with the first vane. The second piezoelectric element may be aligned axially and circumferentially with the second vane. The first vane may vibrate with a first phase during operation of the gas turbine engine assembly. The second vane may vibrate with a second phase during operation of the gas turbine engine assembly. The circuit may be configured to receive an electric signal from the first piezoelectric element, change a phase of the electric signal so that the phase is destructive to the vibration of the second vane, and transmit the electric signal to the second piezoelectric element after changing the phase.

According to another aspect of the present disclosure, a method may include a number of steps. The method may include providing a first component, a second component located adjacent the first component, and a vibration-dampening system including a first piezoelectric element coupled to the second component, rotating the first component relative to the second component to cause the second component to vibrate, energizing the first piezoelectric element with the vibration of the second component to generate electric energy, and converting the electric energy into one of heat and mechanical energy.

In some embodiments, the method further includes providing a second piezoelectric element coupled to the second component. The method may further include transmitting the electric energy from the first piezoelectric element to the second piezoelectric element. In some embodiments, the method further includes changing a phase of the electric energy before transmitting the electric energy from the first piezoelectric element to the second piezoelectric element.

According to another aspect of the present disclosure, a compressor assembly for a gas turbine engine includes a rotating wheel assembly, a compressor case, and a plurality of piezoelectrics. The rotating wheel assembly may include a plurality of blades arranged around a central axis of the compressor assembly. The plurality of blades may be configured to rotate about the central axis during use of the compressor assembly. The compressor case may be arranged circumferentially around the blades of the rotating wheel assembly. The plurality of piezoelectrics may be coupled to the compressor case and powered by compressor case vibrations during use of the compressor assembly.

The plurality of piezoelectrics may include a first piezoelectric element and a second piezoelectric element electrically connected to the first piezoelectric element such that movement of the first piezoelectric element causes movement of the second piezoelectric. The second piezoelectric element may be spaced apart from the first piezoelectric element to dampen the compressor case vibrations during use of the compressor assembly.

In some embodiments, the compressor assembly may further include a controller. The controller may be connected to the first piezoelectric element and the second piezoelectric element.

According to another aspect of the present disclosure, a gas turbine engine assembly may include a static component, a rotatable component, and a plurality of piezoelectrics. The rotatable component may be configured to rotate about a central axis of the gas turbine engine assembly relative to the static component. The plurality of piezoelectrics may be coupled to the static component and may be powered by vibration of the static component during operation of the gas turbine engine assembly.

The plurality of piezoelectrics may include a first piezoelectric element and a second piezoelectric element electrically connected to the first piezoelectric element such that movement of the first piezoelectric element causes movement of the second piezoelectric. The second piezoelectric element may be located relative to the first piezoelectric element so that movement of the second piezoelectric element dampens the vibration of the static component during operation of the gas turbine engine assembly.

In some embodiments, each of the plurality of piezoelectrics may be circumferentially spaced apart from adjacent piezoelectrics. In some embodiments, the plurality of piezoelectrics may be aligned with one another axially.

In some embodiments, the plurality of piezoelectrics may further include a third piezoelectric element located circumferentially between the first piezoelectric element and the second piezoelectric element. In some embodiments, the second piezoelectric element may be spaced apart axially relative to the first piezoelectric element.

In some embodiments, the gas turbine engine may further include an engine controller and a damping controller. The damping controller may be connected to the first piezoelectric element and the second piezoelectric element. The damping controller may be different than the engine controller.

These and other features of the present disclosure will become more apparent from the following description of the illustrative embodiments.

DETAILED DESCRIPTION OF THE DRAWINGS

Figure 1:
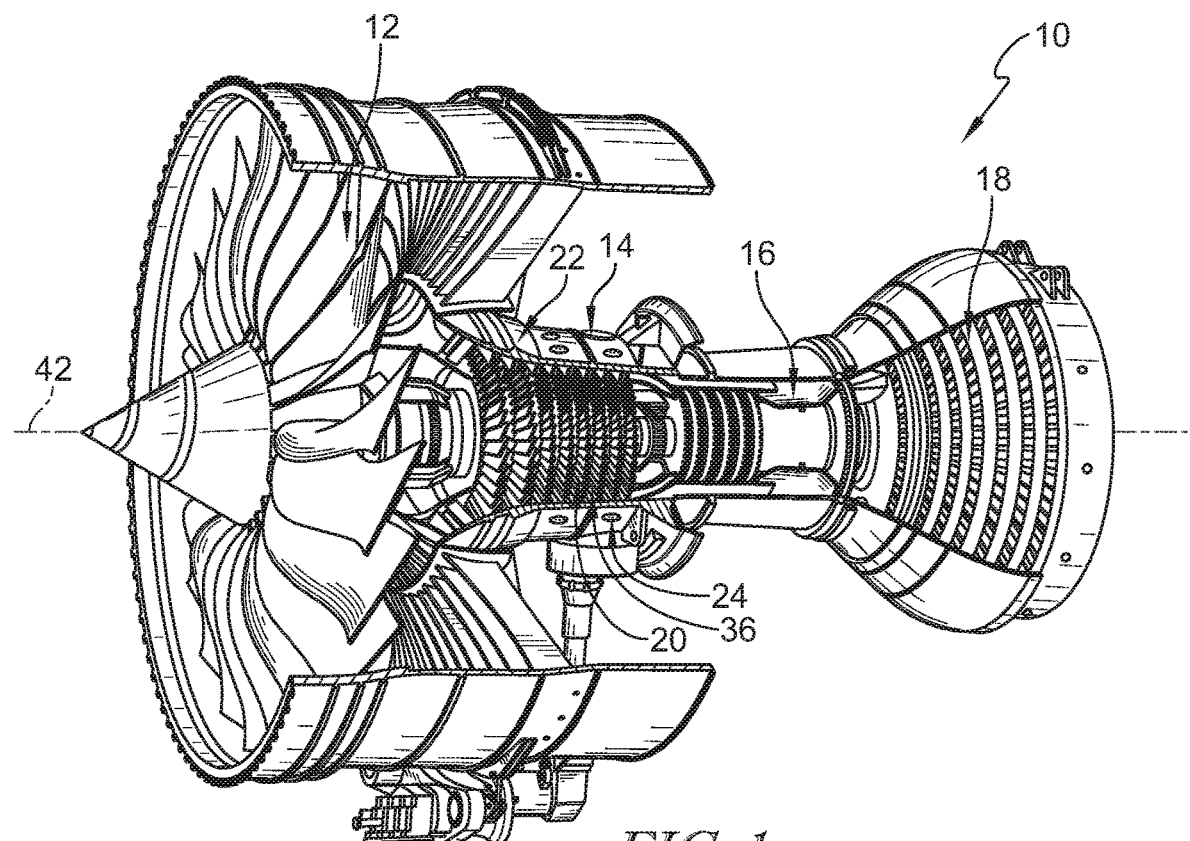
FIG. 1 is a cut-away perspective view of a gas turbine engine in accordance with the present disclosure showing that the gas turbine includes a fan, a compressor, a combustor, and a turbine and that a plurality of piezoelectric elements are coupled to a case of the compressor.

For the purposes of promoting an understanding of the principles of the disclosure, reference will now be made to a number of illustrative embodiments illustrated in the drawings and specific language will be used to describe the same.

An illustrative gas turbine engine 10 includes a fan 12, a compressor 14, a combustor 16, and a turbine 18 as shown in FIG. 1. The fan 12 is configured to provide thrust for an aircraft and is powered by the turbine 18. The compressor 14 compresses and delivers air to the combustor 16. The combustor 16 mixes fuel with the compressed air received from the compressor 14 and ignites the fuel. Hot combustion products of the combustion reaction in the combustor 16 are directed into the turbine 18. The turbine 18 extracts work from the hot combustion products to drive the compressor 14 and the fan 12.

Figure 2:
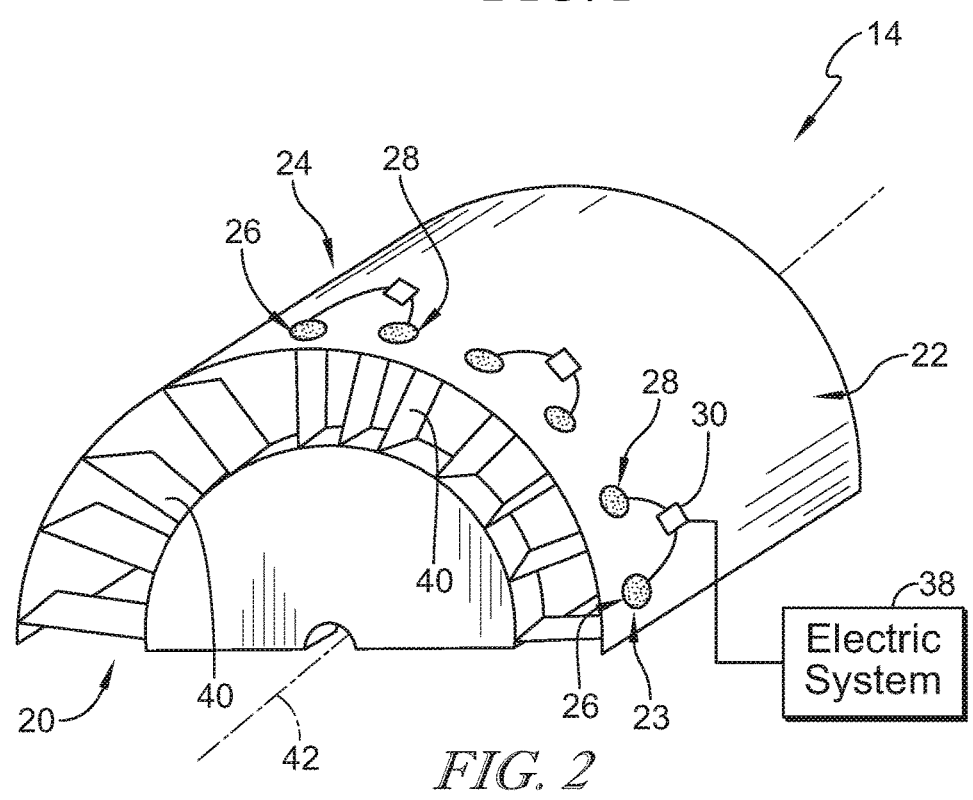
FIG. 2 is a diagrammatic view of the compressor of FIG. 1 showing that the compressor includes a plurality of airfoils arranged around a central axis of the gas turbine engine, the compressor case arranged circumferentially around the airfoils, and a plurality of piezoelectrics coupled to the compressor case and configured to dampen vibration of the compressor case during operation of the gas turbine engine.

The compressor 14 includes a rotating wheel assembly 20 and a compressor case 22 arranged around the rotating wheel assembly 20 as shown in FIGS. 1 and 2. The rotating wheel assembly 20 includes a plurality of blades 40 and the blades 40 are arranged to rotate about a central axis 42 of the gas turbine engine 10 to compress air and push the compressed air aft toward the combustor 16.

Figure 3:
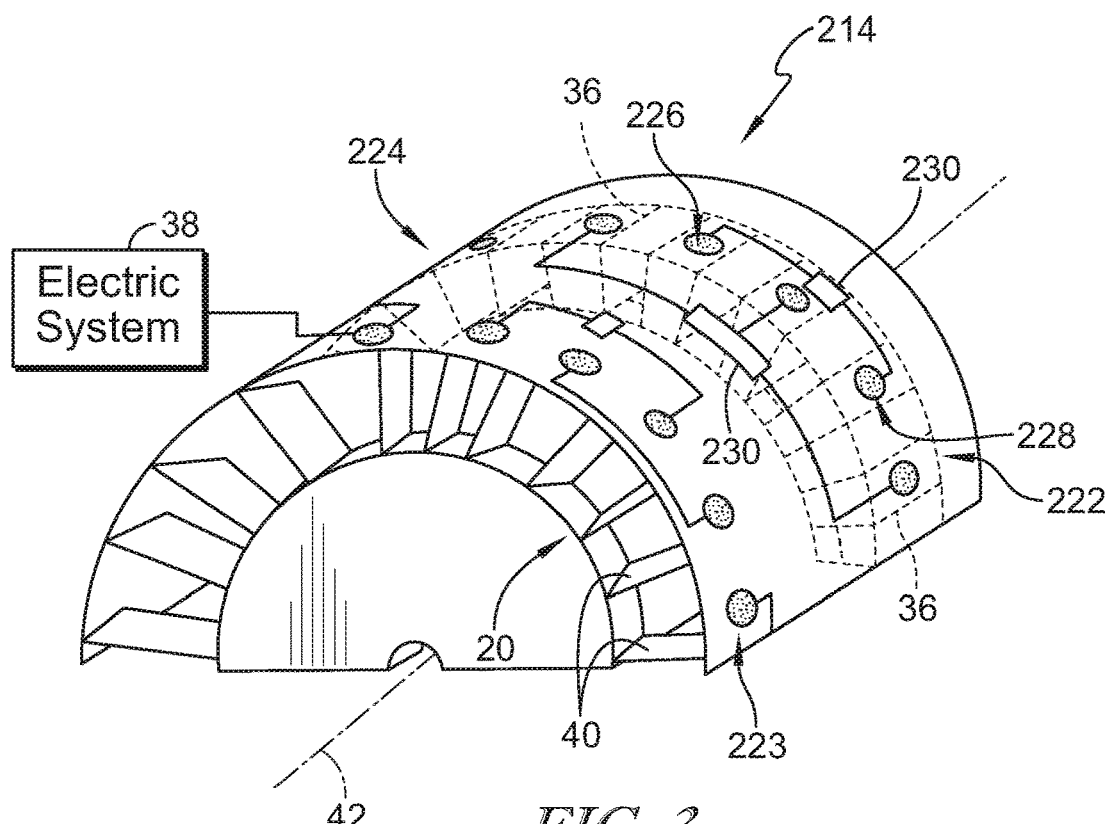
FIG. 3 is a diagrammatic view of another embodiment of a compressor in accordance with the present disclosure adapted for use with the gas turbine engine of FIG. 1 showing multiple piezoelectric elements connected together.
Figure 4:
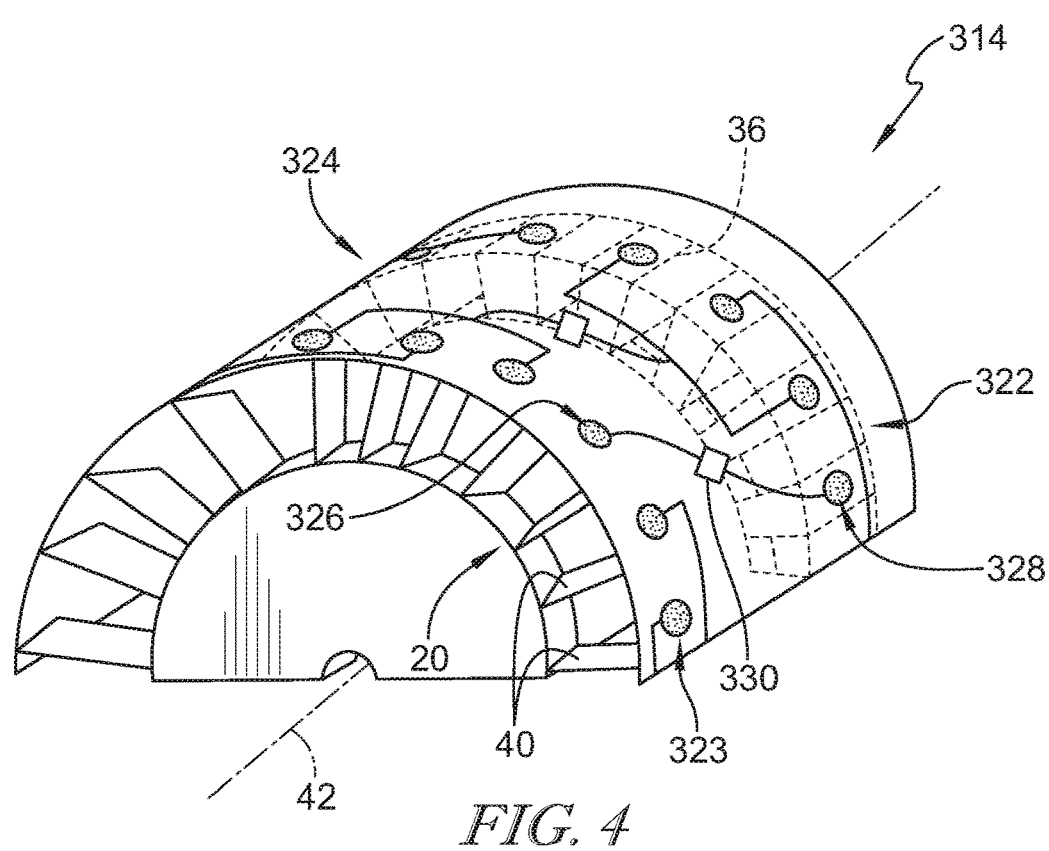
FIG. 4 is a diagrammatic view of another embodiment of a compressor in accordance with the present disclosure adapted for use with the gas turbine engine of FIG. 1.

The compressor case 22 includes an outer housing arranged around the rotating wheel assembly 20 to define a flow path for the compressed air as shown in FIG. 2. The compressor case 22 includes a plurality of vanes 36. The plurality of airfoil shaped vanes 36 are arranged circumferentially about the central axis 42 and are located axially adjacent the rotating wheel assembly 20 as shown in FIGS. 3 and 4.

The illustrative gas turbine engine 10 further includes a vibration-dampening system 23 as shown in FIGS. 1 and 2. The vibration-dampening system 23 is coupled to the compressor case 22 to dampen vibration of the compressor case 22 during use of the gas turbine engine 10. The vibration-dampening system 23 includes a plurality of piezoelectrics 24 coupled to the compressor case 22. Illustratively, the plurality of piezoelectrics 24 are powered by the vibration of the compressor case 22 during operation of the gas turbine engine 10. As a result, the plurality of piezoelectrics 24 are powered without the use of an electric energy source such as a battery or an electric motor-generator. The plurality of piezoelectrics 24 are coupled to an outer surface of the compressor case 22 in the illustrative embodiments.

In illustrative embodiments, the plurality of piezoelectrics 24 include a first piezoelectric element 26 and a second piezoelectric element 28 electrically connected to the first piezoelectric element 26 such that movement of the first piezoelectric element 26 causes movement of the second piezoelectric element 28 as suggested in FIG. 2. The second piezoelectric element 28 is spaced apart from the first piezoelectric element 26 to dampen vibrations of the compressor case 22 during operation of the gas turbine engine 10.

The vibration-dampening system 23 further includes a circuit 30 (sometimes called a controller) connected to the first and second piezoelectric elements 26, 28 as shown in FIG. 2. The circuit 30 may be different than and/or spaced apart from an engine controller configured to control the engine 10. In other embodiments, the first and second piezoelectric elements 26, 28 are connected together such that the compressor case vibrations are dampened without a controller connected to the first and second piezoelectric elements 26, 28.

The first piezoelectric element 26 is configured to generate an electric signal in response to being energized by the vibration of the compressor case 22 during use of the gas turbine engine 10. The circuit 30 is configured to receive the electric signal and transmit the electric signal to the second piezoelectric element 28 to energize the second piezoelectric element 28. The electric signal causes the second piezoelectric element 28 to move such that the vibration of the compressor case 22 is dampened during use of the gas turbine engine 10.

In some embodiments, the circuit 30 changes a phase of the electric signal. The second piezoelectric element 28 may be vibrated by the gas turbine engine 10 at a predetermined frequency during operation of the gas turbine engine 10. The circuit 30 is configured to change the phase of the electric signal received from the first piezoelectric element 26 so that the phase of the electric signal transmitted to the second piezoelectric element 28 causes the second piezoelectric element 28 to move in a destructive pattern relative to the predetermined frequency.

The circuit may be configured to produce a phase shift destructive to a predetermined nodal diameter of the compressor case 22, vanes 36, or piezoelectric element 28. In some embodiments, the circuit 30 is configured to change the phase of the electric signal received from the first piezoelectric element 26 to be about 180 degrees apart from a phase of the predetermined frequency. For example, if the phase of the electric signal is about 0 degrees and the phase of the predetermined frequency is about 30 degrees, the circuit 30 changes the phase of the electric signal by negative 150 degrees before transmitting the electric signal to the second piezoelectric element 28. The circuit may determine the predetermined frequency and adjust the phase of the electric signal based on the determined the predetermined frequency. The predetermined frequency may change during operation of the engine 10, for example, at different operating conditions, max take off, cruise, etc.

In illustrative embodiments, the vibration-dampening system 23 further includes an electric system 38 as shown in FIG. 2. The circuit 30 is coupled to the electric system 38 and the electric system 38 is powered by at least a portion of the electric signal generated by the first piezoelectric element 26. The electric system 38 includes an electric heater in some embodiments so that the vibration of the compressor case 22 may be bled off in the form of heat via the mechanical energy of the first piezoelectric element 26 to electric energy to heat from the electric system 38. The electric heater may be a resistive heater.

In some embodiments, the first piezoelectric element 26 is aligned axially with the plurality of vanes 36. A first vane included in the plurality of vanes 36 may vibrate with a first phase during operation of the gas turbine engine 10. A second vane included in the plurality of vanes 36 may vibrate with a second phase during operation of the gas turbine engine 10. The circuit 30 is configured to receive the electric signal from the first piezoelectric element 26, change a phase of the electric signal so that the phase is destructive to the vibration of the second vane, and transmit the electric signal to the second piezoelectric element 28 after changing the phase. In some embodiments, the first piezoelectric element 26 is aligned axially with the plurality of blades 40.

Illustratively, each of the plurality of piezoelectrics 24 is circumferentially spaced apart from adjacent piezoelectrics 24 as shown in FIG. 2. In the illustrative embodiment, each of the plurality of piezoelectrics 24 is aligned with one another axially. In other embodiments, the piezoelectrics 24 may be misaligned circumferentially and/or axially.

In illustrative embodiments, mechanical energy may be extracted from the first piezoelectric element 26 at a first nodal diameter pattern. The mechanical energy may be used to excite the compressor case 22 into a second nodal diameter pattern. The second nodal diameter pattern may dissipate energy through friction/heat. One or more of the piezoelectric elements may be connected across resistive elements to generate heat or power a device.

A method of operating the gas turbine engine 10 may include a plurality of steps. The method may include providing a first component 20, a second component 22 located adjacent the first component 20, and a vibration-dampening system 23 including a first piezoelectric element 26 coupled to the second component 22, rotating the first component 20 relative to the second component 22 to cause the second component 22 to vibrate, energizing the first piezoelectric element 26 with the vibration of the second component 22 to generate electric energy, and converting the electric energy into one of heat and mechanical energy.

The method may further include providing a second piezoelectric element 28 coupled to the second component 22. The method may further include transmitting the electric energy from the first piezoelectric element 26 to the second piezoelectric element 28. The method may further include changing a phase of the electric energy before transmitting the electric energy from the first piezoelectric element 26 to the second piezoelectric element 28.

Another illustrative embodiment of a compressor 214 adapted for use with the gas turbine engine 10 is shown in FIG. 3. The compressor 214 is substantially similar to the compressor 14 and described herein. Accordingly, similar reference numbers in the 200 series indicate features that are common between the compressor 14 and the compressor 214. The description of the compressor 14 is hereby incorporated by reference to apply to the compressor 214, except in instances when it conflicts with the specific description and drawings of the compressor 214.

The compressor 214 includes vibration-dampening system 223 including a plurality of rows of piezoelectrics 224 as shown in FIG. 3. The piezoelectrics 224 in each row are circumferentially spaced apart from adjacent piezoelectrics 224 and aligned with one another axially. As shown in FIG. 3, each row of piezoelectrics 224 is spaced apart axially from adjacent rows of piezoelectrics 224.

The plurality of piezoelectrics 224 further includes a third piezoelectric element 230 located circumferentially between the first piezoelectric element 226 and the second piezoelectric element 228 as shown in FIG. 3. In other embodiments, any number of piezoelectrics 224 may be located circumferentially between the first piezoelectric element 226 and the second piezoelectric element 228. Illustratively, the piezoelectrics 224 are spaced apart from one another by an equidistant amount. In other embodiments, the spacing of the piezoelectrics 224 may vary and may be chosen to minimize the vibration of the combustor case 222. Circuits 230 connect one or more piezoelectric elements 224.

Another illustrative embodiment of a compressor 314 adapted for use with the gas turbine engine 10 is shown in FIG. 4. The compressor 314 is substantially similar to the compressor 14 and the compressor 214 and described herein. Accordingly, similar reference numbers in the 300 series indicate features that are common between the compressor 14, the compressor 214, and the compressor 314. The description of the compressor 14 and the compressor 214 are hereby incorporated by reference to apply to the compressor 314, except in instances when it conflicts with the specific description and drawings of the compressor 314.

The compressor 314 includes a vibration-dampening system 323 as shown in FIG. 4. The second piezoelectric element 328 of the compressor 314 is spaced apart axially from the first piezoelectric element 326 as shown in FIG. 4. Illustratively, a number of piezoelectrics 324 in a first row are connected with a number of piezoelectrics 324 in a second row. Circuits 330 connect one or more piezoelectric elements 224.

In some embodiments, the present disclosure provides piezoelectric element damping applied to static components. In illustrative embodiments, piezoelectrics are mounted to one or more static components such as, for example, a compressor case, vane shroud, or any structure that can transfer energy to/from the vanes in a fan or compressor. In some embodiments, the piezoelectrics are mounted on outlet guide vanes (sometimes referred to as OGV). The piezoelectrics are wired together around the circumference of the component to extract vibratory energy as well as to excite static structures out of phase with the vibration and cancel it out. Energy may be spread from one engine order to multiple engine orders (or into engine orders that are more highly damped).

In some embodiments, a piezoelectric element array is mounted on one vane row to extract energy and, optionally, the array is wired to another row. In some embodiments, components such as, for example, compressor cases are split at 180 degrees wiring for the piezoelectrics extend across the split boundaries.

In accordance with the present disclosure, the piezoelectrics may account for inter-vane phase angle between each piezoelectric element receptor/emitter and vanes. In such embodiments, the structure is flexible enough such that the piezoelectric element can deform the structure. In some embodiments, the piezoelectrics include a circuit for accounting for inter-vane phase angle of vibration. In illustrative embodiments, the piezoelectrics are spaced apart from nodes of vibration. In some embodiments, the piezoelectrics are mounted at locations of high deformation.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine assembly comprising
a wheel assembly having a plurality of blades arranged around a central axis of the gas turbine engine assembly and the wheel assembly configured to rotate about the central axis during use of the gas turbine engine assembly,
a compressor case arranged circumferentially around the plurality of blades included in the wheel assembly, and
a vibration-dampening system coupled to the compressor case to dampen vibration of the compressor case during use of the gas turbine engine assembly and the vibration-dampening system including a first piezoelectric element coupled to the compressor case, a second piezoelectric element coupled to the compressor case, and a circuit coupled to the first piezoelectric element and the second piezoelectric element, wherein the second piezoelectric element is vibrated by the gas turbine engine assembly at a predetermined frequency during operation of the gas turbine engine assembly, and the first piezoelectric element is configured to generate an electric signal in response to being energized by the vibration of the compressor case during use of the gas turbine engine assembly, the circuit is configured to receive the electric signal, change the phase of the electric signal received from the first piezoelectric element so that the phase of the electric signal transmitted to the second piezoelectric element causes the second piezoelectric element to move in a destructive pattern relative to the predetermined frequency to cause the vibration of the compressor case to be dampened during use of the gas turbine engine.

2. The gas turbine engine assembly of claim 1, wherein the circuit is configured to change the phase of the electric signal received from the first piezoelectric element to be about 180 degrees apart from a phase of the predetermined frequency.

3. The gas turbine engine assembly of claim 1, wherein the circuit is configured to determine the predetermined frequency.

4. The gas turbine engine assembly of claim 1, wherein the compressor case includes an outer housing that extends at least partway about the central axis and a plurality of vanes that extend radially between the outer housing and the central axis and the first piezoelectric element is aligned axially with the plurality of vanes.

5. The gas turbine engine assembly of claim 1, wherein the second piezoelectric element is spaced apart circumferentially from the first piezoelectric element.

6. The gas turbine engine assembly of claim 5, wherein the second piezoelectric element is aligned axially with the first piezoelectric element.

7. The gas turbine engine assembly of claim 1, wherein the second piezoelectric element is spaced apart axially from the first piezoelectric element.

8. The gas turbine engine assembly of claim 1, wherein the vibration-dampening system further includes an electric system, the circuit is coupled to the electric system, and the electric system is powered by at least a portion of the electric signal generated by the first piezoelectric element.

9. The gas turbine engine assembly of claim 8, wherein the electric system includes a resistive heater.

10. A gas turbine engine assembly comprising
a first component configured to rotate about a central axis of the gas turbine engine assembly,
a second component located adjacent the first component and configured to remain fixed relative to the central axis, and
a vibration-dampening system including a first piezoelectric element and a second piezoelectric element and the first piezoelectric element and the second piezo electric element are coupled to the second component and energized by vibration of the second component during use of the gas turbine engine assembly,
wherein the vibration-dampening system further includes a circuit connected to the first piezoelectric element and the second piezoelectric element, the first piezoelectric element generates a first electric signal, the second piezoelectric element generates a second electric signal, and the circuit is configured to receive the first electric signal and the second electric signal, change a phase of the first electric signal and the second electric signal, transmit the first electric signal to the second piezoelectric element, and transmit the second electric signal to the first piezoelectric element after changing the phase of the first electric signal and the second electric signal.

11. The gas turbine engine assembly of claim 10, wherein the vibration-dampening system further includes an electric heater connected to the first piezoelectric element and powered by the first piezoelectric element in response to the first piezoelectric element being energized.

12. A gas turbine engine assembly comprising
a first component configured to rotate about a central axis of the gas turbine engine assembly,
a second component located adjacent the first component and configured to remain fixed relative to the central axis, a vibration-dampening system including a first piezoelectric element and a second piezoelectric element and the first piezoelectric element and the second piezo electric element are coupled to the second component and energized by vibration of the second component during use of the gas turbine engine assembly, and
a circuit connected to the first piezoelectric element and the second piezoelectric element, the second component includes a first vane and a second vane, the first piezoelectric element is aligned axially and circumferentially with the first vane, the second piezoelectric element is aligned axially and circumferentially with the second vane, the first vane vibrates with a first phase during operation of the gas turbine engine assembly, the second vane vibrates with a second phase during operation of the gas turbine engine assembly, and the circuit is configured to receive an electric signal from the first piezoelectric element, change a phase of the electric signal so that the phase is destructive to the vibration of the second vane, and transmit the electric signal to the second piezoelectric element after changing the phase.

* * * * *